(12) United States Patent
Vangaru et al.

(10) Patent No.: US 11,825,529 B2
(45) Date of Patent: Nov. 21, 2023

(54) SYSTEMS AND METHODS FOR WIRELESS DEVICE MODES

(71) Applicant: Meta Platforms Technologies, LLC, Menlo Park, CA (US)

(72) Inventors: Srinivasa Prasad Vangaru, Dublin, CA (US); Qi Qu, Redmond, WA (US); Ping Wang, Redmond, WA (US); Dong Zheng, Saratoga, CA (US); Insoo Hwang, Sammamish, WA (US); Jiansong Wang, Lincroft, NJ (US); Gahima Stephen Mbonye, San Jose, CA (US); Swaminathan Balakrishnan, Los Gatos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 53 days.

(21) Appl. No.: 17/372,081

(22) Filed: Jul. 9, 2021

(65) Prior Publication Data
US 2023/0010265 A1    Jan. 12, 2023

(51) Int. Cl.
*H04W 76/10* (2018.01)
*H04W 68/02* (2009.01)
(Continued)

(52) U.S. Cl.
CPC ........... *H04W 76/10* (2018.02); *H04W 68/02* (2013.01); *H04W 76/28* (2018.02)

(58) Field of Classification Search
CPC ..... H04W 76/10; H04W 68/02; H04W 76/28; H04W 52/0219; H04W 52/0229; H04W 52/0254; H04W 52/0216
(Continued)

(56) References Cited

U.S. PATENT DOCUMENTS

| 7,012,993 B2* | 3/2006 | Alton | H04W 76/38 |
| | | | 379/26.01 |
| 10,681,665 B2* | 6/2020 | Singh | H04W 88/04 |

(Continued)

OTHER PUBLICATIONS

Berry N., "CT WG4 Status Report to TSG CT#71," 3GPP Draft, CP-160010 CT4 Report To CT#71 Plenary, 3rd Generation Partnership Project (3GPP), Mobile Competence Centre, Feb. 29, 2016, 38 pages.
(Continued)

*Primary Examiner* — Inder P Mehra
(74) *Attorney, Agent, or Firm* — Foley & Lardner LLP (57) ABSTRACT

Disclosed herein are systems and methods for facilitating wireless communication of a wearable device. In one aspect, a wireless device receives a paging message from a cellular network, via a wireless link between the wireless device and a companion device. The paging message can be received while a cellular modem of the wireless device is operating in reduced power mode and not registered with the cellular network, and the companion device is registered with the cellular network. The wireless device can transition the cellular modem from the reduced power mode to an active mode in response to receiving the paging message via the wireless link with the companion device. The wireless device can register with the cellular network after the modem has transitioned to active mode, to establish a cellular link directly with the cellular network.

18 Claims, 7 Drawing Sheets

(51) Int. Cl.
  *H04W 76/28*  (2018.01)
  *H04W 52/02*  (2009.01)
(58) Field of Classification Search
  USPC .......................................................... 370/329
  See application file for complete search history.

(56) References Cited

U.S. PATENT DOCUMENTS

| | | | |
|---|---|---|---|
| 2004/0203789 A1* | 10/2004 | Hammond | ............ H04W 36/32 |
| | | | 455/552.1 |
| 2005/0221842 A1 | 10/2005 | Kaneko et al. | |
| 2015/0156717 A1* | 6/2015 | Narasimha | ........ H04W 52/0209 |
| | | | 370/311 |
| 2018/0352514 A1* | 12/2018 | Singh | ...................... H04W 4/02 |
| 2020/0053830 A1 | 2/2020 | Venkataraman et al. | |
| 2021/0195587 A1* | 6/2021 | Kaikkonen | ............... H04L 5/14 |
| 2022/0303943 A1* | 9/2022 | Xu | ........................ H04W 76/14 |

OTHER PUBLICATIONS

International Search Report and Written Opinion for International Application No. PCT/US2022/036054, dated Oct. 21, 2022, 10 pages.

* cited by examiner

SYSTEMS AND METHODS FOR WIRELESS DEVICE MODES

FIELD OF DISCLOSURE

The present disclosure is generally related to facilitating wireless communication for a wearable device, including but not limited to facilitating wireless communication in response to a user contact with the wearable device.

BACKGROUND

Developments in computing devices and communication devices have prompted growth in wearable technology. Wearable devices may integrate various components in a compact form, such that the wearable devices can be portable yet perform complex processes. For example, a wearable device may be a smart watch that may access content over the network, and may control or communicate with other computing devices, etc. For example, a wearable device may be a head mounted display (HMD) that may present artificial reality (e.g., virtual reality, augmented reality, mixed reality, etc.).

SUMMARY

Various embodiments disclosed herein are related to methods and systems of facilitating wireless communication of a wireless device (e.g., a wearable device). One implementation of the present disclosure is a method that includes receiving, by a wireless device, a paging message from a cellular network, via a wireless link between the wireless device and a companion device. In some embodiments, the paging message is received while a cellular modem of the wireless device is operating in reduced power mode and not registered with the cellular network, and the companion device is registered with the cellular network. In some embodiments, the method includes transitioning, by the wireless device, the cellular modem from the reduced power mode to an active mode in response to receiving the paging message via the wireless link with the companion device. In some embodiments, the method includes registering, by the wireless device, with the cellular network after the modem has transitioned to active mode, to establish a cellular link directly with the cellular network.

In some embodiments, the wireless link is a link other than one based on the cellular network. In some embodiments, the wireless link includes a link that is based on Bluetooth protocol, wireless local area network (WLAN) protocol, or ultra-wideband protocol. In some embodiments, establishing the cellular link directly with the cellular network includes bypassing the companion device and the wireless link in communicating with the cellular network. In some embodiments, in the reduced power mode, the cellular modem is configured to only receive incoming paging messages from the cellular network. In some embodiments, the method includes communicating, by the wireless device, with the cellular network via the established cellular link, in response to the paging message. In some embodiments, the method includes updating, by the wireless device, a discontinuous reception (DRX) cycle of the cellular modem when the wireless device is registered with the cellular network, in accordance with the wireless device being connected via the wireless link with the companion device. In some embodiments, the method includes receiving, by the wireless device via the wireless link using the updated DRX cycle, another paging message from the cellular network. In some embodiments, the method includes communicating, by the wireless device, with the cellular network in response to the another paging message, via the cellular link.

In some embodiments, the method includes determining, by at least one sensor of the wireless device, information about the wireless device's movement. In some embodiments, the method includes updating, by the wireless device, the DRX cycle of the cellular modem further in accordance with the information about the wireless device's movement.

In some embodiments, updating the DRX cycle includes increasing the DRX cycle from a regular or defined DRX cycle to an extended DRX cycle. In some embodiments, the method includes transitioning, by the wireless device, from the extended DRX cycle to the regular or defined DRX cycle, when the wireless device ceases to be connected via the wireless link with the companion device.

Another implementation of the present disclosure includes a wireless device, according to some embodiments. In some embodiments, the wireless device includes a cellular modem comprising at least one processor. The at least one processor is configured to receive a paging message from a cellular network, via a wireless link between the wireless device and a companion device, while the cellular modem is operating in reduced power mode and not registered with the cellular network, and the companion device is registered with the cellular network, according to some embodiments. In some embodiments, the at least one processor is configured to transition from the reduced power mode to an active mode in response to receiving the paging message via the wireless link with the companion device. In some embodiments, the at least one processor is configured to register with the cellular network after the cellular modem has transitioned to active mode, to establish a cellular link directly with the cellular network.

In some embodiments, the wireless link is a link other than one based on the cellular network. In some embodiments, the cellular modem is configured to establish the cellular link directly with the cellular network by bypassing the companion device and the wireless link in communicating with the cellular network. In some embodiments, the cellular modem is configured to communicate with the cellular network in response to the paging message, via the established cellular link.

In some embodiments, the cellular modem is configured to update a discontinuous reception (DRX) cycle of the cellular modem when the wireless device is registered with the cellular network, in accordance with the wireless device being connected via the wireless link with the companion device. In some embodiments, the cellular modem is configured to receive, via the wireless link using the updated DRX cycle, another paging message from the cellular network. In some embodiments, the cellular modem is configured to communicate with the cellular network via the cellular link in response to the another paging message.

In some embodiments, the wireless device includes at least one sensor configured to determine information about the wireless device's movement. In some embodiments, the cellular modem is configured to update the DRX cycle further in accordance with the information about the wireless device's movement.

In some embodiments, updating the DRX cycle includes increasing the DRX cycle from a regular or defined DRX cycle to an extended DRX cycle. In some embodiments, the cellular modem is configured to transition from the extended DRX cycle to the regular or defined DRX cycle, when the wireless device ceases to be connected via the wireless link with the companion device.

Another implementation of the present disclosure includes a non-transitory computer readable medium storing program instructions for causing at least one processor of a cellular modem of a wireless device to implement steps, according to some embodiments. In some embodiments, the steps include receiving a paging message from a cellular network, via a wireless link between the wireless device and a companion device, while the cellular modem is operating in reduced power mode and not registered with the cellular network, and the companion device is registered with the cellular network. In some embodiments, the steps include transitioning the cellular modem from the reduced power mode to an active mode in response to receiving the paging message via the wireless link with the companion device. In some embodiments, the steps include registering the cellular modem with the cellular network after the cellular modem has transitioned to active mode, to establish a cellular link directly with the cellular network.

In some embodiments, the program instructions cause the at least one processor to establish the cellular link directly with the cellular network by bypassing the companion device and the wireless link in communicating with the cellular network. These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Overview

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to a wireless communications system. In one embodiment, the wireless communications system includes a wireless device (e.g., a wearable device), a cellular network, and a companion device (e.g., a smartphone). The companion device and the wireless device can communicate wirelessly with each other via a communications link (e.g., a Bluetooth link). In some embodiments, the wireless device is configured to operate in a tethered or an untethered mode. When the wireless device is in the tethered mode, the wireless device may communicate indirectly with the cellular network via a communications link between the companion device and the cellular network (e.g., with the companion device providing a wireless hotspot and/or operating as a soft access point to the wireless device). When the wireless device is in the untethered mode, the wireless device may communicate directly with the cellular network via a direct communications link between the wireless device and the cellular network.

The wireless device may operate according to a DRX cycle so that messages are received at the wireless device periodically or discontinuously. In some embodiments, the wireless device is also configured to operate in a reduced power mode (e.g., during a defined portion of the DRX cycle) where the wireless device only receives messages (e.g., paging messages) but does not respond to the messages. The wireless device can also include a display and may operate the display to provide the messages to the user when in the reduced power mode.

In some embodiments, the wireless device can transition between the tethered and the untethered mode, and can adjust the DRX cycle based on a variety of factors. For example, the wireless device may monitor motion detection or sensor data of motion detectors, and can adjust the DRX cycle in response to the motion detection. Similarly, the wireless device can be transitioned from the tethered mode to the untethered mode (including performing an attach process or registration process on the cellular network) when signal strength between the wireless device and the companion device is low (e.g., below a threshold value) or when the signal strength between the wireless device and the companion device is steadily decreasing (indicating that the wireless device is moving away from and out of range of the companion device).

In some embodiments, the wireless device is configured to transition from a low power and/or a tethered mode, to an active and/or untethered mode in response to receiving a paging message. For example, when the wireless device receives a paging message from the cellular network through the companion device, the wireless device may transition into an active mode, and register itself on the cellular network so that the wireless device establishes a direct communications link between the wireless device and the cellular network.

In some embodiments, it is determined if/whether the wireless device and the companion device are in a tethered state or mode. The wireless device can be a third party or reduced-capability device that does not have low power mode (LPM) or limited service mode functionality (e.g., for its cellular modem/chip/interface), and may only support active mode for instance. The capability/functionality of the wireless device can be detected by the companion device once communication is established between the wireless device and the companion device. In response to the companion device and the wireless device being in the tethered state, the wireless device may be in the active mode, and may be registered on a cellular network. For instance, the wireless device may register itself (or a cellular modem of the wireless device) on the cellular network (e.g., prior to receiving a paging message), in order to facilitate rapid transitioning to communicating on the cellular network (e.g., when the wireless device receives the paging message). This can reduce latency that may occur when the wireless device registers and connects on the cellular network only after receiving a paging message. When the wireless device is registered with the cellular network (e.g., 3G, 4G, long term evolution (LTE), 5G, or 6G network), and connects directly to the cellular network, the wireless device and the companion device may become/be untethered. In response to the companion and the wireless device being in the tethered state, a DRX cycle of the wireless device may be extended or increased so that the wireless device sleeps (e.g., operates in inactive or low power mode) more frequently, thereby reducing power consumption of the wireless device. In response to the wireless device and the companion device being in an untethered state, or transitioning into the untethered state, the DRX cycle of the wireless device can be adjusted to a standard DRX cycle. The standard DRX cycle may be shorter than the extended or increased DRX cycle so that the wireless device sleeps less frequently, and the wireless device can receive and/or respond to notifications, communications, messages, etc., received via the cellular network (e.g., LTE network). The techniques described herein can be performed to facilitate power and cost savings depending on the capability/functionality of the wireless device. For example, the wireless device can be a third party device or reduce-capability device that does not have LPM or limited service mode functionality.

In some embodiments, the wireless device (e.g., the wireless device's cellular modem/chip/interface) may support a LPM mode or a limited service mode). It may be determined if/whether the wireless device and the companion device are in a tethered state or mode. In response to the companion and wireless device being in an untethered state (e.g., lacking direct wireless communication between the companion device and the wireless device), the wireless device may be registered and connected directly to the cellular network to receive and respond to network traffic, and the DRX cycle of the wireless device may be adjusted or set to a standard DRX cycle. The standard DRX cycle can be a predetermined or baseline DRX cycle and may be tailored to the wireless device. In response to the wireless device and the companion device being in the tethered state, the wireless device may be transitioned into the LPM mode or the limited service mode (e.g., not registered with the cellular network) to thereby reduce power consumption. If a paging message (e.g., a mobile terminal page) is not received, the wireless device may be maintained in the LPM mode or the limited service mode to continue reducing power consumption. If a paging message (e.g., mobile terminal page) is received, the wireless device may be triggered to register and/or connect with the cellular network (e.g., to attach to an LTE network) to facilitate direct communications by the wireless device on the cellular network. The wireless device may function as a standalone networked device when connected with the cellular network.

When the wireless device and the companion device are tethered (e.g., via a BT link), the DRX cycle of the wireless device can also be adjusted based on sensor data, a radio communication strength therebetween, etc., or any other data indicating a likelihood that the wireless device may become untethered (or suffer from a weak wireless link) from the companion device. In some embodiments, the DRX cycle of the wireless device is only used when the wireless device is registered with the cellular network or in a limited service mode. In some embodiments, when the wireless device is in the LPM, the wireless device is not serviced by LTE and does not require a DRX cycle. For example, if sensor data indicates that a signal strength between the wireless device and the companion device is decreasing (e.g., as the wireless device increases in distance from the companion device), the DRX cycle may be decreased so that the wireless device sleeps less frequently, thereby preemptively preparing the wireless device to connect directly with the cellular network if the wireless device becomes untethered, or if the wireless connection between the wireless device and the companion device is degraded/weak/disrupted. Similarly, motion data indicating a degree of usage of the wireless device can be used to decrease the DRX cycle of the wireless device. One or more types of sensors (e.g., accelerometers, gyroscopes, light detectors, proximity sensors, camera, etc.) of the wireless device can be used to acquire, obtain or determine the sensor data.

Although various embodiments disclosed herein are provided with respect to wearable devices, principles disclosed herein can be applied to other handheld devices (e.g., smart phones, tablet computers, laptops, etc.).

System Architecture

Figure 1:
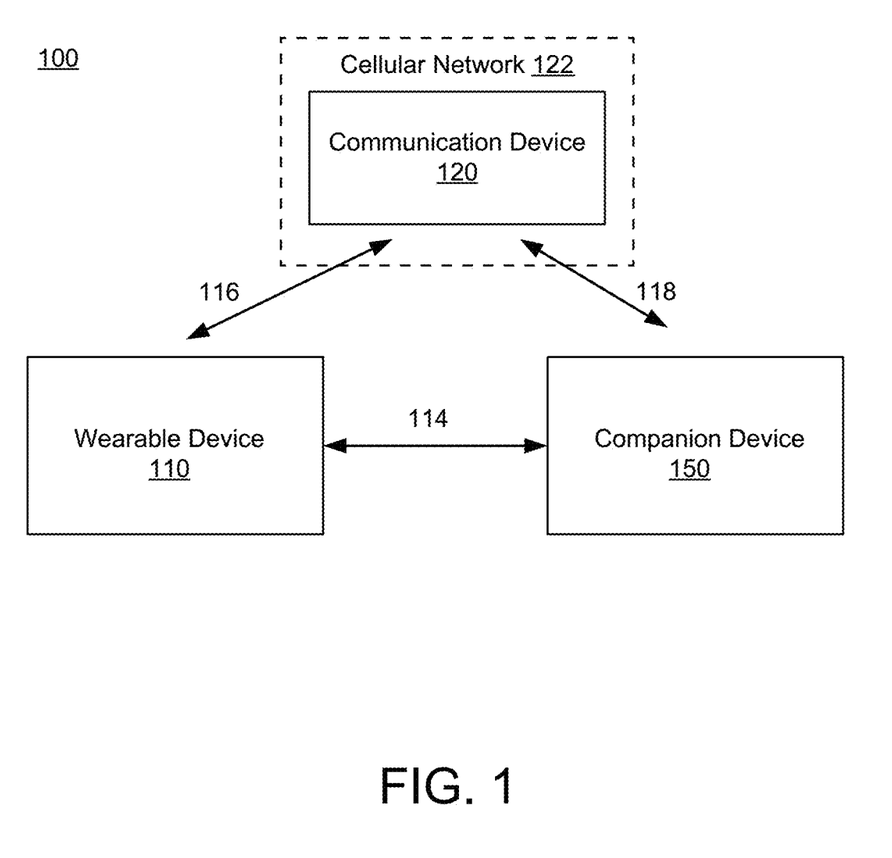
FIG. 1 is a diagram of a system environment including wearable devices, according to some embodiments.

FIG. 1 is a block diagram of an example system 100. In some embodiments, the system 100 includes a communication device 120, a wearable device 110, and a companion device 150. The wearable device 110 may be a smart watch, a head wearable device (HWD), etc., or any other wearable device. In some embodiments, the wearable device 110 is a wireless device. The communication device 120 may be an access point or base station of a cellular network 122, or any other communication device. The companion device 150 may be referred to as, include, or be part of a head mounted display (HMD), head mounted device (HMD), head worn display (HWD), head worn device (HWD), smartphone, cellular device, personal computer device, etc. The wearable device 110 and the companion device 150 may communicate with each other through a communication link 114 (e.g., a Bluetooth link). The wearable device 110 and the communication device 120 may communicate with each other through a communication link 116 (e.g., cellular link), and the companion device 150 and the communication device 120 may communicate with each other through a communication link 118 (e.g., cellular link). Through the wireless links 116, 118, the wearable devices 110 and the companion device 150 may access content (e.g., text, image, audio, video, etc.) from other devices (e.g., via the cellular network 122). The communication links 114, 116, 118 may each be a wireless link of any type (e.g., cellular link, Wi-Fi link, Bluetooth link, 60 GHz link, ultra wideband link, etc.). The communication links 114, 116, 118 may be based on the same protocol or different protocols. For example, the communication links 116, 118 may conform to the 3G, 4G, 5G, LTE, 60 GHz protocol, where the communication link 114 may conform to the Wi-Fi link, Bluetooth, etc., protocol. In some embodiments, the system 100 includes more, fewer, or different components than shown in FIG. 1. The communication links 114, 116, or 118 can each be any of a link that is based on a Bluetooth protocol, a wireless local area network (WLAN) protocol, or an ultra-wideband protocol. In some embodiments, when the wearable device 110 communicates with the cellular network 122 via the communications link 116, the wearable device 110 communicates directly with the cellular network 122 and bypasses the companion device 150.

In one aspect, the wearable device 110 and the companion device 150 may operate together to provide/support artificial reality for a user. In one example, the companion device 150 may detect a location and an orientation of the companion device 150, and generate a sensor measurement indicating the detected location and orientation of the companion device 150. The companion device 150 may transmit the sensor measurement to the wearable device 110 through the communication link 114. The wearable device 110 may receive the sensor measurement, and may generate or determine a view of the artificial reality corresponding to the detected location and orientation of the companion device 150. The wearable device 110 may generate image data of the determined view of the artificial reality, and transmit the image data to the companion device 150 through the communication link 114. The companion device 150 may receive the image data, and can present an image of the artificial reality to a user according to the image data. In one aspect, the process of detecting the location and the orientation of the companion device 150, and rendering the image to the user should be performed within a frame time (e.g., 11 ms or 16 ms). Any latency between a movement of the user wearing the HWD and an image displayed corresponding to the user movement can cause judder, which may result in motion sickness and can degrade the user experience.

In some embodiments, the wearable device 110 and the companion device 150 are configured to exchange data (e.g., SMS text messages, data, MMS messages, VoIP data, cellular data, cellular data, etc.) directly with each other on a local network via the communication link 114 and/or directly with the communication device 120 and the cellular network 122 thereof via the links 116 and 118. In some embodiments, the wearable device 110 (e.g., a wireless device) is configured to communicate with the communication device 120 or the cellular network 122 thereof via the companion device 150 (e.g., the companion device 150 facilitating indirect communication between the wearable device 110 and the communication device 120). For example, the companion device 150 may receive data from the communication device 120 of the cellular network 122 via the link 118 and forward or send the data to the wearable device 110 via the link 114.

Wearable Device

Figure 2:
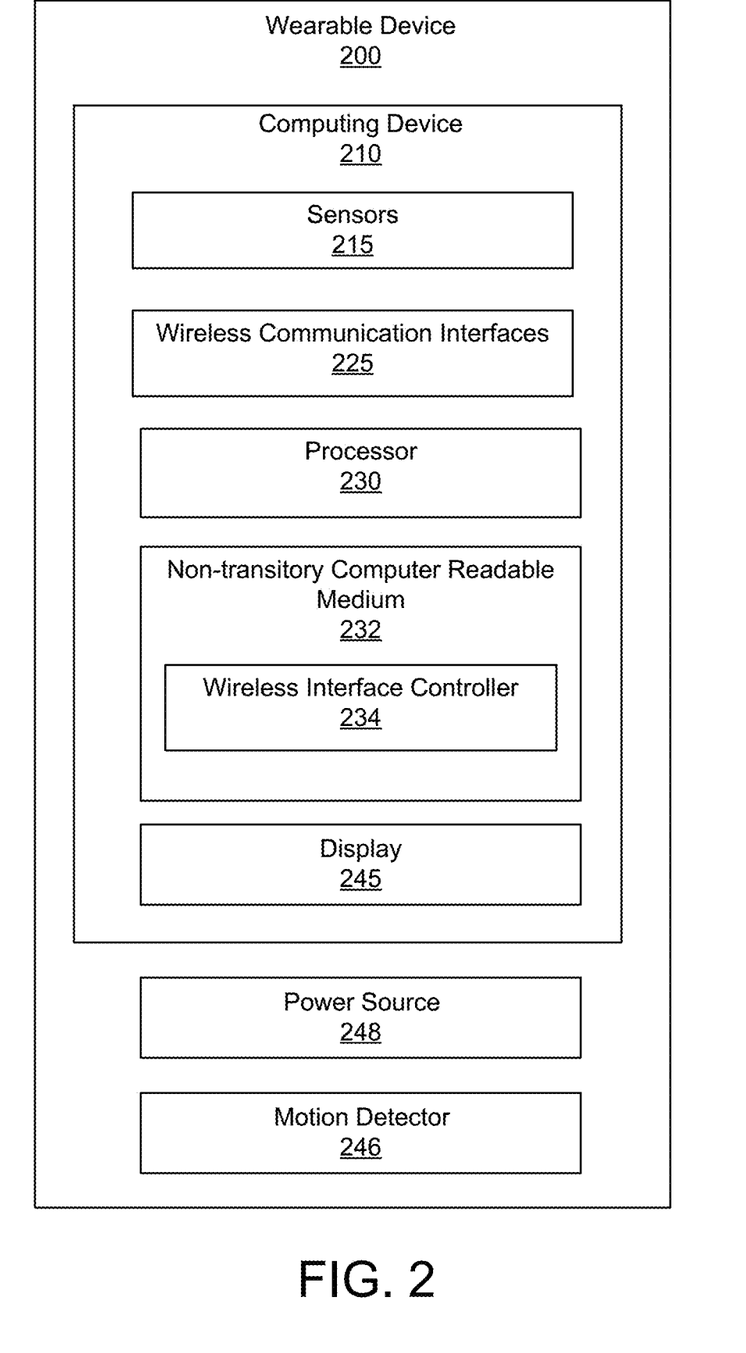
FIG. 2 is a diagram of a wearable device, according to some embodiments.

FIG. 2 is a diagram of a wearable device 200, according to an example implementation of the present disclosure. In some embodiments, the wearable device 110 and/or the companion device 150 are the same as or similar to the wearable device 200 as described herein. In some embodiments, the wearable device 200 includes a computing device 210 and a cradle (not shown in FIG. 2), to which the computing device 210 can be selectively attached. In some embodiments, the computing device 210 includes sensors 215, wireless communication interfaces 225 (also referred to as "wireless interfaces 225" herein), processor 230, non-transitory computer readable medium 232, and a display 245. The wearable device 200 also includes a power source 248 (e.g., a battery, a battery cell, Lithium-Ion batteries, a capacitor, an electrical energy storage device, etc.) that is configured to provide electrical energy for the various components of the wearable device 200. The wearable device 200 also includes a motion detector 246 (e.g., a sensor such as an accelerometer, a gyroscope, etc.) that is configured to measure motion of the wearable device 200. These components may operate together to communicate with another device, and generate or render content (e.g., artificial reality content). In other embodiments, the wearable device 200 includes more, fewer, or different components than shown in FIG. 2.

In some embodiments, the sensors 215 include electronic components or a combination of electronic components and software components that detect a proximity of a user wearing the wearable device 200. For example, the sensors 215 can include a hall sensor that can detect whether the user is proximate (e.g., less than 10 mm) to the sensor or whether the user is contacting the computing device 210 (e.g., contacting and/or blocking a certain component of the device used/configured for wireless communication). The sensors 215 may detect a proximity of the user with respect to the computing device 210, and can generate a sensor measurement data indicating the detected proximity.

In some embodiments, the sensors 215 include electronic components or a combination of electronic components and software components that can operate to sense/determine/measure a location, motion/movement and/or an orientation of the computing device 210. Examples of the sensors 255 can include: one or more imaging sensors, one or more accelerometers, one or more gyroscopes, one or more magnetometers, or any other suitable type of sensor(s) that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 215 detect the translational movement and the rotational movement, and determine an orientation and location of the computing device 210. The sensors 215 may generate sensor measurements indicating the detected location and orientation of the computing device 210.

In some embodiments, wireless communication interfaces 225 include electronic components or combinations of electronic components and software components that communicate with another device through wireless communication links (e.g., communication link 114, 116, 118). In some embodiments, the wireless communication interfaces 225 include a wireless interface for a cellular communication link (e.g., 3G, 4G, LTE, 5G, 6G communication link). The wireless communication interfaces 225 may also include a wireless interface for a different communication link (e.g., Wi-Fi or Bluetooth communication link). In some embodiments, wireless communication interfaces 225 include or are embodied as transceivers or communication modems (e.g., a cellular modem) coupled to the transceivers for transmitting and receiving data through wireless mediums. The wireless communication interfaces 225 may transmit or receive sensor measurement data indicating locations and orientations of the computing device 210. Moreover, the wireless communication interface 225 may transmit or receive image data indicating or corresponding to images to be rendered.

In some embodiments, the processor 230 includes an electronic component or a combination of an electronic component that can execute instructions stored by the non-transitory computer readable medium 232. The processor 230 may include one or more central processing units (CPUs), graphical processing units (GPUs) or a combination of them. The non-transitory computer readable medium 232 may store instructions for executing one or more applications executable by the processor 230.

One example application when executed by the processor 230 may cause the processor 230 to generate or process content for rendering. The processor 230 executing the application may cause the processor 230 to generate image data for rendering, according to sensor measurement data from the sensors 215 or the wireless communication interfaces 225. For example, the processor 230 executing the application may determine a view of the artificial reality corresponding to detected location and orientation in the sensor measurement data and generate image data of the determined view of the artificial reality.

Example applications when executed by the processor 230 may cause the processor 230 to control or adjust the wireless communication interface 225. Example applications include wireless interface controller 234. The wireless interface controller 234 may be executed by the processor 230 to detect whether the computing device 210 is attached to a cradle. In response to determining that the computing device 210 is detached from the cradle, the processor 230 executing the wireless interface controller 234 may determine whether the contact of the user with the computing device 210 interferes with the wireless communication link or not. In response to determining that the contact of the user with the computing device 210 interferes with the wireless communication link, the processor 230 executing the wireless interface controller 234 may initiate a process to facilitate communication of the data.

In one aspect, the processor 230 receives a sensor measurement indicating whether the computing device 210 is attached to or detached from a cradle (e.g., indicating usage of the device, so as to adjust a length of its DRX cycle). For example, the sensor 215 includes a hall sensor or any electrical sensor that can generate a sensor measurement indicating whether the computing device 210 is attached to or detached from a cradle. According to the sensor measurement, the processor 230 may determine whether a user contact with the computing device 210 degrades the signal quality of the wireless communication link or not (e.g., so as to adjust a length of a DRX cycle). For example, in response to the sensor measurement indicating that the computing device 210 is attached to the cradle, the processor 230 may determine whether the user contact with the computing device 210 degrades the signal quality of the wireless communication link or not. For example, in response to the sensor measurement indicating that the computing device 210 is not detached from the cradle, the processor 230 may bypass or skip determining whether the user contact with the computing device 210 degrades the signal quality of the wireless communication link or not.

In one approach, the processor 230 may determine whether a user contact with the computing device 210 degrades the signal quality of the wireless communication link or not, according to a receive signal metric of the wireless communication interface 225. An example receive signal metric includes reference signals received power (RSRP), reference signal received quality (RSRQ), etc. To determine whether the user contact with the computing device 210 degrades the signal quality of the wireless communication link or not, the processor 230 may compare a first receive signal metric of the wireless communication link at a first time and a second receive signal metric of the wireless communication link at a second time after the first time. For example, in response to determining that the second receive signal metric is worse or lower than the first receive signal metric by an amount larger than a threshold amount, the processor 230 may determine that the user contact with the computing device 210 degrades the signal quality of the wireless communication link. The threshold amount may be adjustable or reconfigurable. In response to determining that the second receive signal metric is worse or lower than the first receive signal metric by an amount less than the threshold amount (e.g., within a defined time period, which may include the first time and the second time), the processor 230 may determine that the user contact with the computing device 210 does not degrade the signal quality of the wireless communication link.

In one approach, the processor 230 may determine whether the user contact with the computing device 210 degrades the signal quality of the wireless communication link or not, according to an uplink transmit power level of the wireless communication interface 225. For example, the processor 230 may determine that the user contact with the computing device 210 degrades or reduces the signal quality of the wireless communication link, in response to an uplink transmit power of the wireless interface reaching or exceeding a defined transmit power level. The processor 230 may determine that the user contact with the computing device 210 degrades the signal quality of the wireless communication link, in response to i) determining that the second receive signal metric is worse or lower than the first receive signal metric by an amount larger than the threshold amount, and ii) determining that the uplink transmit power of the wireless interface reaches or exceeds a defined transmit power level. Based on the sudden drop in the receive signal metric (e.g., according to the defined time period, and/or the first time and the second time), an increased transmit power level, and/or the computing device 210 being detached from the cradle, the processor 230 may infer or determine with a high accuracy/certainty that the user contact with the computing device 210 has degraded the signal quality of the wireless communication link.

In one approach, the processor 230 may determine whether the user contact with the computing device 210 degrades the signal quality of the wireless communication link or not, according to a user equipment measurement reporting event (e.g., so as to adjust a length of a DRX cycle). The user equipment measurement reporting event may be a reporting event for cellular protocols (e.g., LTE, etc.).

In some embodiments, the display 245 is an electronic component that displays an image. The display 245 may, for example, be a liquid crystal display or an organic light emitting diode display. The display 245 may be a touch screen display. The display 245 may be a transparent display that allows the user to see through.

Head Wearable Device

Figure 3:
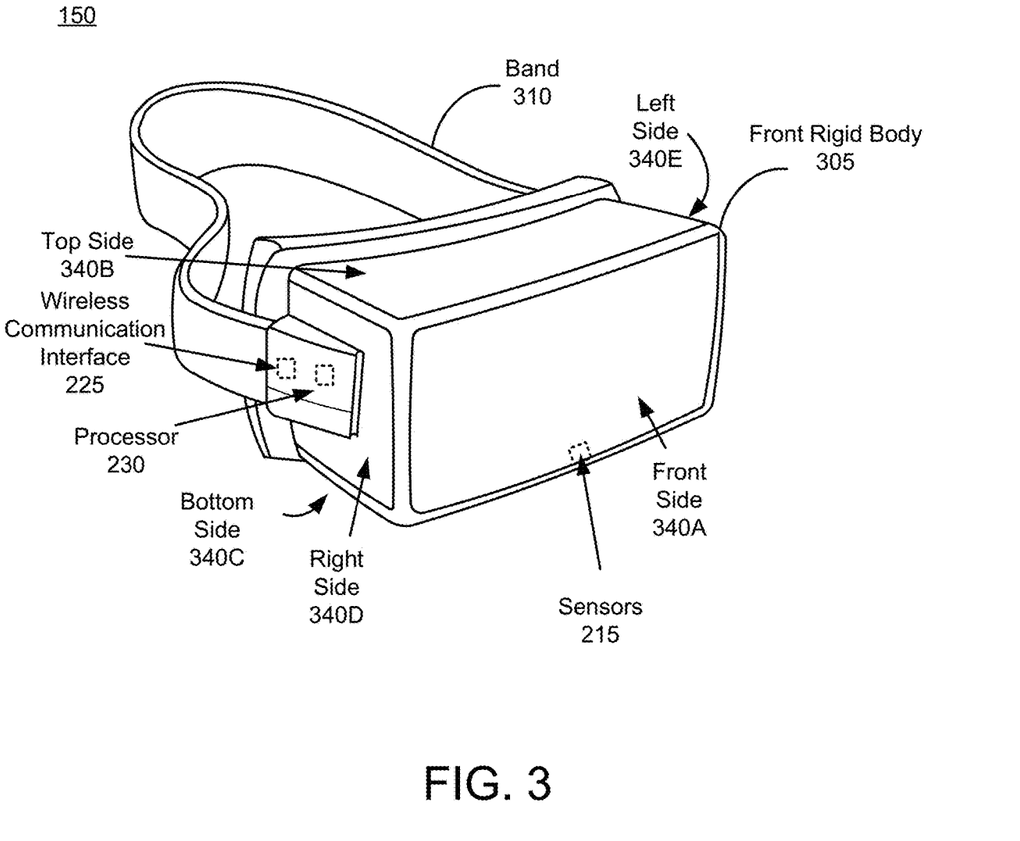
FIG. 3 is a diagram showing a perspective view of a head wearable display, according to some embodiments.

FIG. 3 is a diagram of the companion device 150, in accordance with an example embodiment. In some embodiments, the companion device 150 includes a front rigid body 305 and a band 310. The front rigid body 305 includes the display 245 (not shown in FIG. 3), lens (not shown in FIG. 3), the sensors 215, the wireless communication interface 225, and the processor 230. In the embodiment shown by FIG. 3, the wireless communication interface 225, the processor 230, and the sensors 215 are located within the front rigid body 205, and may not be visible to the user. In other embodiments, the companion device 150 has a different configuration than shown in FIG. 3. For example, the wireless communication interface 225, the processor 230, and/or the sensors 215 may be in different locations than shown in FIG. 3.

Example System Architecture

Figure 4:
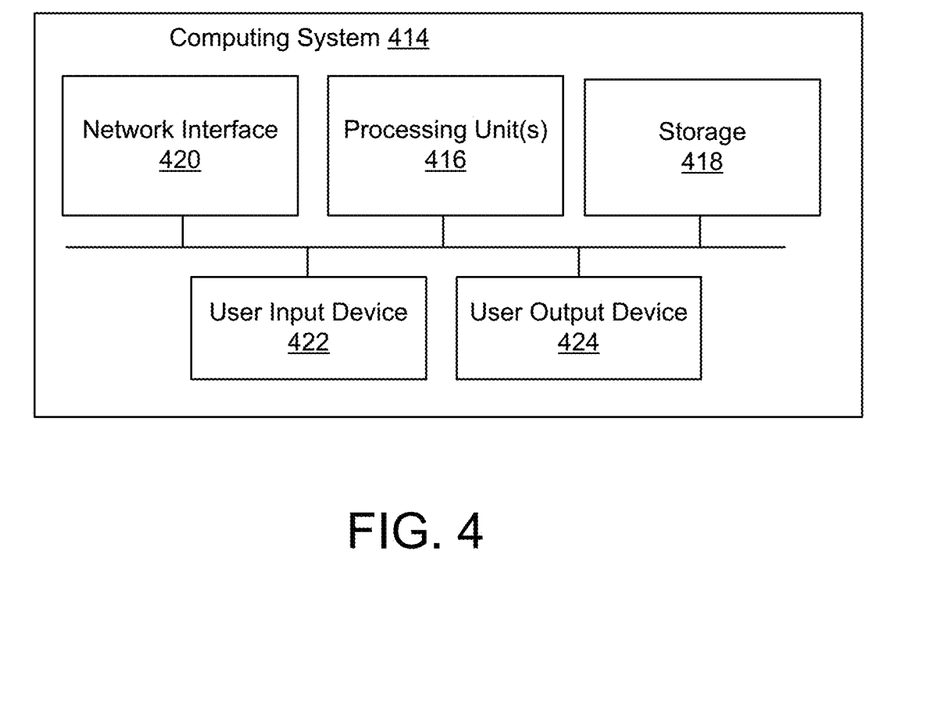
FIG. 4 is a block diagram of a computing environment according to some embodiments.

Various operations described herein can be implemented on computer systems. FIG. 4 shows a block diagram of a representative computing system 414 usable to implement the present disclosure. In some embodiments, the wearable device 110, the companion device 150 or both of FIG. 1 are implemented by the computing system 414. Computing system 414 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 414 can be implemented to provide VR, AR, MR experience. In some embodiments, the computing system 414 can include conventional computer components such as processors 416, storage device 418, network interface 420, user input device 422, and user output device 424.

Network interface 420 can provide a connection to a wide area network (e.g., the Internet) to which WAN interface of a remote server system is also connected. Network interface 420 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 422 can include any device (or devices) via which a user can provide signals to computing system 414; computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 424 can include any device via which computing system 414 can provide information to a user. For example, user output device 424 can include a display to display images generated by or delivered to computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 416 can provide various functionality for computing system 414, including any of the functionality described herein as being performed by a server or client, or other functionality associated with message management services.

It will be appreciated that computing system 414 is illustrative and that variations and modifications are possible. Computer systems used in connection with the present disclosure can have other capabilities not specifically described here. Further, while computing system 414 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

DRX Cycle Adjustments

Referring particularly to FIGS. 1 and 2, the wearable device 110 is operable in a variety of different modes, according to some embodiments. In some embodiments, the wearable device 110 (and/or its wireless/cellular modem/chip/interface) is operable in a low power mode (LPM) (e.g., a reduced power or sleep mode), a limited service mode, an active mode, or a tethered mode. It should be understood that the modes of the wearable device 110 are not necessarily separate discrete modes and that functionality of the various modes of the wearable device 110 described herein can overlap with each other (e.g., the LPM mode and the limited service mode, or functionality of the wearable device 110 thereof may overlap).

The wearable device 110 also operates according to a discontinuous reception (DRX) cycle, according to some embodiments. In some embodiments, the wearable device 110 is transitionable between a state or mode where data is sent/received (e.g., an active mode or state) and an inactive state or mode where the wearable device 110 is communicably inactive (e.g., except for receiving paging messages, in some embodiments) and does not send and/or receive data (e.g., a sleep mode, an inactive mode, the limited service mode, the LPM mode, etc.). In some embodiments, the wearable device 110 operates according to one or more DRX parameters that defines the behavior of the wearable device 110. In some embodiments, the DRX cycle is one of the DRX parameters. The DRX cycle may be the sum of a duration of 'On Time' of the wearable device 110 (e.g., a time duration during which the wearable device 110 is communicably active to send and/or receive communications) and a duration of 'Off Time' of the wearable device 110 (e.g., a time duration during which the wearable device 110 is communicably inactive to send and/or receive communications). In some embodiments, the DRX parameters include an on-time duration which defines an amount of time that the wearable device 110 is communicably active. In some embodiments, the DRX parameters also include a DRX-inactivity timer, a DRX retransmission timer, a short-DRX-cycle parameter, and/or a DRXShortCycleTimer.

When the wearable device 110 is in the tethered mode, the wearable device 110 is configured to communicate directly with the companion device 150 (e.g., via the link 114), according to some embodiments. In some embodiments, the companion device 150 is configured to route, send, or directly provide messages, data, etc., from the communication device 120 or the cellular network 122 to the wearable device 110 via a Bluetooth (BT) link (e.g., the link 114). In this way, when the wearable device 110 is in the tethered mode, the wearable device 110 can communicate indirectly with the cellular network 122 via the companion device 150.

In some embodiments, the wearable device 110 is in the tethered mode while also being in the LPM. For example, the wearable device 110 can be configured to operate in the LPM with an increased DRX cycle to thereby facilitate power savings at the wearable device 110. In some embodiments, the wearable device 110 is configured to receive data (e.g., a paging message) from the companion device 150 when in the LPM and/or from the cellular network 122 when in the LPM mode, but does not provide responses or transmit messages to the companion device 150 and/or the cellular network 122.

In some embodiments, when the wearable device 110 is in the active state, the wearable device 110 is configured to actively provide display of incoming messages to the user. The wearable device 110 can transition into the active state at different times according to the DRX cycle, according to some embodiments.

In some embodiments, when the wearable device 110 is untethered or in the untethered mode, the wearable device 110 is configured to communicate directly with the cellular network 122 via the communications link 116 without requiring communication between the wearable device 110 and the companion device 150. For example, the wearable device 110 may communicate directly (e.g., receive and send messages) to the cellular network 122 via the communication link 116, independently of operation or communication of the companion device 150. In this way, once an attach (or registration/register) procedure is performed to configure the wearable device 110 to communicate with the cellular network 122, the wearable device 110 acts as a standalone device on the cellular network 122.

Processes

Figure 5:
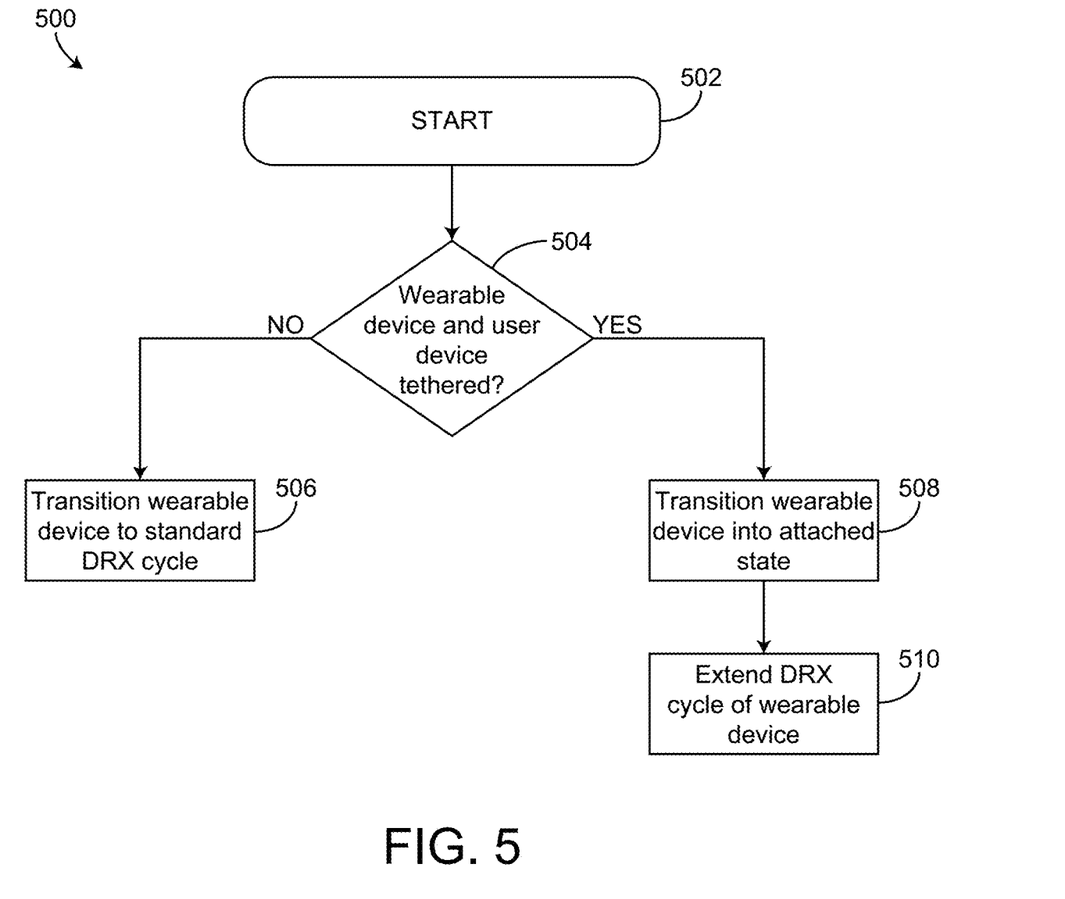
FIG. 5 is a flow diagram of a process for adjusting a DRX cycle of a device, according to some embodiments.

Referring to FIG. 5, a process 500 for adjusting a DRX cycle of a wearable device (e.g., a wireless device) is shown, according to some embodiments. In some embodiments, process 500 includes steps 502-510. In some embodiments, process 500 is performed by the system 100, or more specifically, by the wearable device 110 and the companion device 150. Process 500 can be performed to facilitate power savings by adaptively adjusting the DRX cycle of the wearable or wireless device.

Process 500 includes initiating (step 502) and determining if a wearable device and a user device are tethered (step 504), according to some embodiments. The wearable device (and/or its cellular modem/chip/interface) may lack a LPM or a limited service mode. In some embodiments, step 504 includes determining or detecting if the wearable device (e.g., wearable device 110) is in a tethered state or more (e.g., whether the wearable device lacks a LPM or a limited service mode). In some embodiments, step 504 includes monitoring a connection link between the wearable device and the user device. For example, step 504 can include determining if a Bluetooth link is established between the wearable device and the user device. Step 504 can be performed by the wearable device and/or by the user device cooperatively, or individually. In some embodiments, step 504 is performed by the wearable device 110 and/or the companion device 150.

Process 500 includes transitioning the wearable device into the attached state (step 508), according to some embodiments. In some embodiments, step 508 is performed in response to the wearable device and the user device being tethered (and/or the wearable device lacking a LPM or a limited service mode) (step 504, "YES"). In response to the wearable device and the user device being tethered (and/or the wearable device lacking a LPM or a limited service mode), the wearable device is transitioned into an attached state so that wireless communication between the wearable device and a cellular network is achieved via a wireless link between the user device and the cellular network. For example, the wearable device can be configured to receive messages, packets, data, etc., from the cellular network through the user device. Similarly, the wearable device can provide responses (e.g., messages, data, etc.) such as in response to a user input to the cellular network by sending the responses to the user device, which are then communicated to the cellular network.

Process 500 includes extending a DRX cycle of the wearable device (step 510), according to some embodiments. In some embodiments, step 510 is performed in response to transitioning the wearable device into the attached state (step 508). The DRX cycle can be extended so that an amount of time that the wearable device is in a sleep, inactive, or low power mode is increased, and so that periodic times at which the wearable device "wakes up" are temporally spaced further apart. Advantageously, extending the DRX cycle of the wearable device facilitates power savings of the wearable device.

Process 500 includes transitioning the wearable device to a standard DRX cycle (step 506), according to some embodiments. In some embodiments, step 506 is performed in response to the wearable device and the user device being un-tethered (step 504, "NO"). Step 506 can be performed so that the wearable device has a DRX cycle that is shorter than the extended DRX cycle (e.g., step 510). In some embodiments, step 506 can be performed to provide a standard DRX cycle and so that the wearable device communicates directly with the cellular network.

Figure 6:
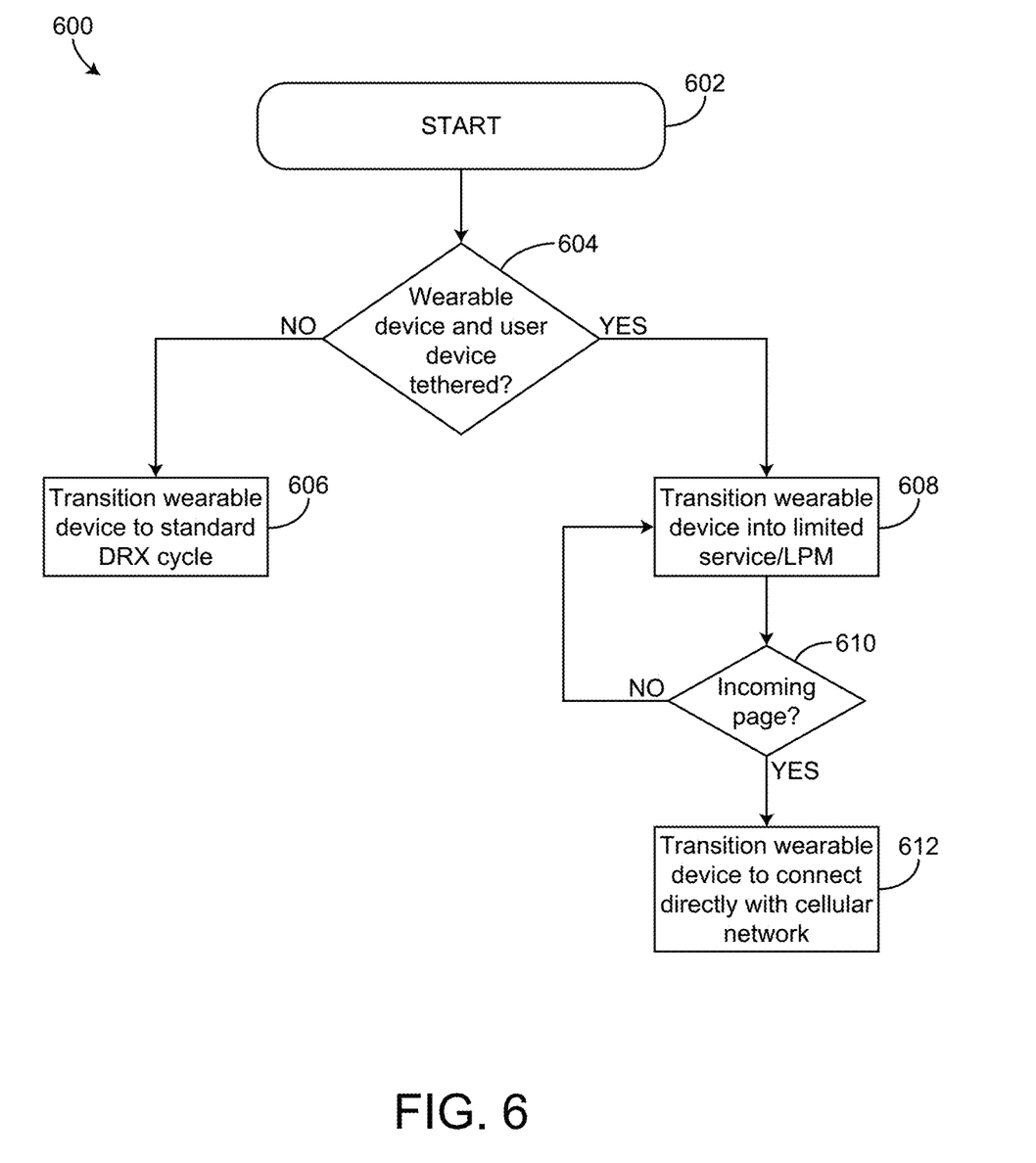
FIG. 6 is a flow diagram of another process for adjusting a DRX cycle of a device, according to some embodiments.

Referring particularly to FIG. 6, a process 600 for adjusting a DRX cycle and operation of a wearable device is shown, according to some embodiments. The wearable device may support a LPM or a limited service mode. Process 600 includes steps 602-612 and can be performed by the system 100 or more particularly by the wearable device 110 and the companion device 150. In some embodiments, process 600 is similar to the process 500 as described in greater detail above with reference to FIG. 5. Process 600 can be performed as an alternative to process 500 and may include any of the various techniques of process 500 as described in greater detail above with reference to FIG. 5.

Process 600 includes initiating (step 602, e.g., in response to start up and/or pairing of a wearable device and a user device), and determining if a wearable device and a user device are tethered (and/or if the wearable device supports a LPM or a or a limited service mode) (step 604), according to some embodiments. In some embodiments, step 604 is the same as or similar to the step 504 of the process 500 as described in greater detail above. For example, step 604 can be performed by the user device and/or the wearable device to determine if a communications link is established between the user device and the wearable device.

Process 600 includes transitioning the wearable device to a standard DRX cycle (step 606), according to some embodiments. In some embodiments, step 606 is performed in response to the wearable device and the user device being tethered (step 604, "NO"). Step 606 can be the same as or similar to the step 506 of the process 500 as described in greater detail above.

Process 600 includes transitioning the wearable device into a limited service or LPM (step 608), according to some embodiments. In some embodiments, step 608 is performed in response to determining that the wearable device and the user device are tethered (and/or that the wearable device supports a LPM or a limited service mode) (step 604, "YES"), according to some embodiments. When the wearable device is in the LPM (or the limited service mode), the wearable device does not send or receive messages directly with a cellular network, according to some embodiments. In some embodiments, when the wearable device is in the LPM, the wearable device depends on a communications link (e.g., the tethered link) between the wearable device and the user device to communicate with the cellular network. In the limited service mode, the wearable device may communicate with the user device but only receives messages from the user device without sending responses to the cellular network via the user device. In this way, the wearable device can receive incoming messages in the limited service mode but cannot respond.

Process 600 includes identifying if a page (e.g., paging message) is incoming (step 610), according to some embodiments. In some embodiments, the page that is incoming is received or identified at the user device (e.g., the companion device 150). In some embodiments, the identification of an incoming page is used to determine if the wearable device should be transitioned out of the limited service mode or the LPM. If an incoming page is not detected, process 600 returns to step 608 and maintains the wearable device in the limited service mode or the LPM, according to some embodiments. If an incoming page is detected, process 600 proceeds to step 612 and may transition the wearable device out of the limited service mode or the LPM.

Process 600 includes transitioning the wearable device to connect directly with the cellular network (step 612), according to some embodiments. In some embodiments, step 612 is performed in response to detection of an incoming page (step 610, "YES"). The wearable device can be transitioned to communicate directly with the cellular network in an active mode at step 612. In some embodiments, step 612 also includes registering the wearable device (e.g., its cellular modem/chip/interface) with the cellular network so that the wearable device can communicate directly (e.g., establish a cellular link) with the cellular network. The wearable device can include a cellular modem that is configured to register with and establish a communications link with the cellular network. In some embodiments, the incoming page is a paging message received from the cellular network via the user device (e.g., when the wearable device and the user device are tethered).

Process 600 can include additional steps (performed subsequently to step 612 or at least partially concurrently with step 612) of registering the wearable device with the cellular network, according to some embodiments. In some embodiments, process 600 includes additional steps of adjusting or updating a DRX cycle of the wearable device or of the cellular modem of the wearable device, receiving additional paging messages, and communicating with the cellular network according to the adjusted or updated DRX cycle. In some embodiments, process 600 includes communicating with the cellular network via the established communications or cellular link in response to the paging message.

Figure 7:
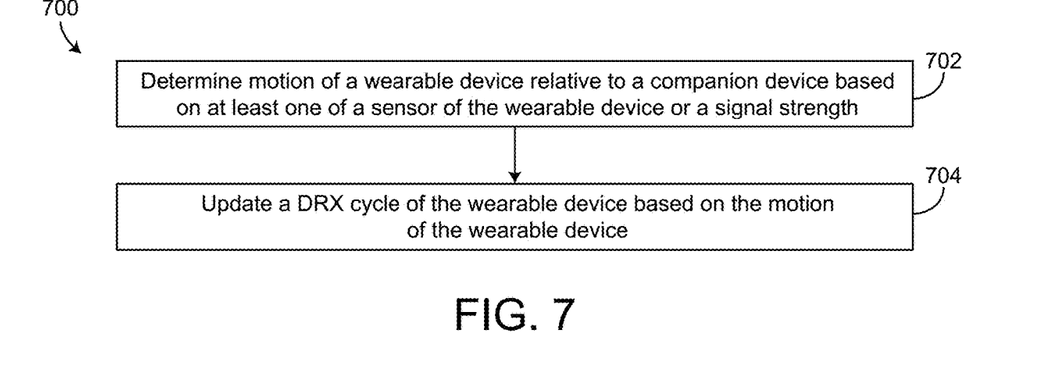
FIG. 7 is a flow diagram of a process for adjusting or updating a DRX cycle of a wireless device in response to motion of the wireless device, according to some embodiments.

Referring to FIG. 7, a process 700 for adjusting or updating a DRX cycle of a wearable device (e.g., a wireless device, the wearable device 110, etc.) is shown, according to some embodiments. Process 700 includes steps 702 and 704 and can be performed based on a signal strength between the wearable device and a companion device (sometimes referred as a user device) or based on sensor data obtained at the wearable device. In some embodiments, process 700 is performed concurrently with or subsequently to step 612 of process 600. In some embodiments, process 700 is performed in response to step 508 or step 506 of process 500.

Process 700 includes determining motion of a wearable device relative to a companion device based on at least one of a sensor of the wearable device or a signal strength between the wearable device and the companion device (step 702), according to some embodiments. In some embodiments, step 702 includes obtaining sensor data from a gyroscope, an accelerometer, etc., of the wearable device (e.g., the motion detector 246) to determine if the wearable device is moving. In some embodiments, step 702 includes determining motion by monitoring a signal strength (e.g., a strength of the communication link 114). For example, if the signal strength decreases over a time period this may indicate that the wearable device is moving away from the companion device. Similarly, if the signal strength increases over a time period this may indicate that the wearable device is moving towards or closer to the companion device. Similarly, the sensor data obtained from the sensor of the wearable device can indicate magnitude and direction of motion of the wearable device.

Process 700 includes updating a DRX cycle of the wearable device based on the motion of the wearable device (step 704), according to some embodiments. In some embodiments, process 700 can be performed when the wearable device is tethered or untethered with the companion device and/or when the wearable device is registered on a cellular network. In some embodiments, the DRX cycle can be increased so that the wearable device is in an inactive or sleep state/mode for a longer period of time, or decreased so that the wearable device is in an inactive or sleep state/mode for a shorter period of time. In some embodiments, step 704 includes updating the DRX cycle of the wearable device based on the determined motion and/or based on whether the determined motion indicates that the wearable device is moving closer to the companion device or if the determined motion indicates that the wearable device is moving farther away from the companion device. In some embodiments, if the wearable device is moving closer to the companion device, the DRX cycle of the wearable device is increased. In some embodiments, if the wearable device is moving further away from the companion device, the DRX cycle of the wearable device is decreased. In some embodiments, step 704 includes increasing the DRX cycle from a regular or defined (shorter) DRX cycle to an extended (longer) DRX cycle in response to the determined motion or in response to the wearable device not being connected to the companion device via a communications link.

Figure 8:
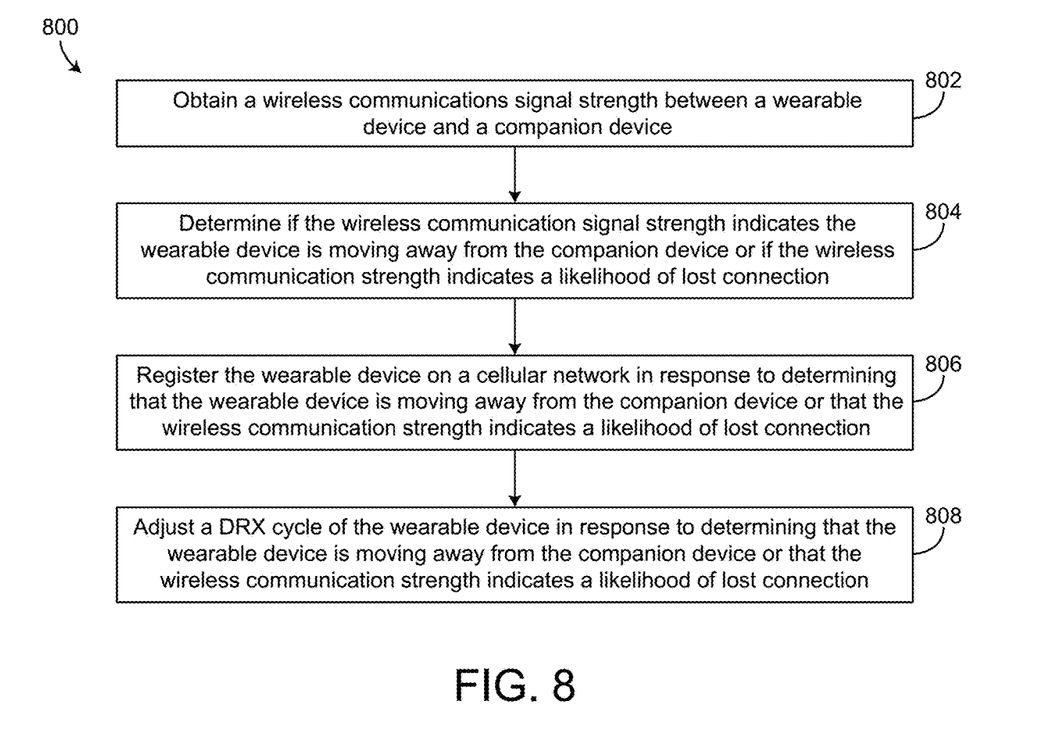
FIG. 8 is a flow diagram of a process for updating an operation of a wireless device to pre-empt disconnection between the wireless device and a companion device, according to some embodiments.

Referring to FIG. 8, a process 800 for pre-emptively registering and/or adjusting a DRX cycle of a wearable device (e.g., a wireless device, the wearable device 110, etc.) based on a likelihood that the wearable device may become disconnected is shown, according to some embodiments. Process 800 includes steps 802-808 and can be performed to pre-emptively register the wearable device on a cellular network.

Process 800 includes obtaining a wireless communications signal strength between a wearable device (e.g., the wearable device 110) and a companion device (e.g., the companion device 150) (step 802), according to some embodiments. In some embodiments, step 802 is performed by the wearable device and/or the companion device by measuring the signal strength between the wearable device and the companion device. In some embodiments, step 802 includes measuring the signal strength of the communications link 114 between the wearable device 110 and the companion device 150.

Process 800 includes determining if the wireless communication signal strength indicates that the wearable device is moving away from the companion device or if the wireless communication strength indicates and likelihood of lost/weak connection between the wearable device and the companion device (step 804), according to some embodiments. In some embodiments, step 804 includes observing if the signal strength decreases over time, which may indicate that the wearable device is moving away from the companion device. If the wearable device is moving away from the companion device, this may indicate a likelihood that the wearable device will be communicably disconnected with the companion device (e.g., when the wearable device is out of range of the companion device, thereby breaking the communications link 114). Similarly, if the signal strength is weak, unsteady or rapidly increasing or decreasing over time, this may indicate also indicate a higher likelihood that the wearable device and the companion device will be incommunicable in the near future (e.g., lost/weak connection).

Process 800 includes registering the wearable device on a cellular network in response to determining that the wearable device is moving away from the companion device or that the wireless communication strength indicates a likelihood of lost connection (step 806), according to some embodiments. In some embodiments, step 806 is performed to pre-emptively configure the wearable device for a transition to a mode where the wearable device communicates directly with the cellular network. Advantageously, the registration step can be performed so that the wearable device is fully configured to communicate on the cellular network even if the wearable device does not send and/or receive messages directly on the cellular network. In some embodiments, step 806 is performed at least partially concurrently with step 808. In some embodiments, step 806 also includes communicating on the cellular network so that the wearable device can preemptively communicate directly with the cellular network even when the communications link between the wearable device and the companion device is still active. In some embodiments, step 808 is performed to establish a direct cellular link between the wearable device (or modem of the wearable device) and the cellular network.

Process 800 includes adjusting a DRX cycle of the wearable device in response to determining that the wearable device is moving away from the companion device or that the wireless communication strength indicates a likelihood of lost/weak connection (step 808), according to some embodiments. In some embodiments, step 808 includes increasing or decreasing the DRX cycle if there is a likelihood of lost connection to preemptively configure the wearable device for direct communication with the cellular network.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   receiving, by a wireless device, a paging message from a cellular network, via a wireless link between the wireless device and a companion device, while a cellular modem of the wireless device is operating in reduced power mode and not registered with the cellular network, and the companion device is registered with the cellular network, the cellular modem configured to operate according to a discontinuous (DRX) cycle;
   transitioning, by the wireless device, the cellular modem from the reduced power mode to an active mode in response to receiving the paging message via the wireless link with the companion device;
   registering, by the wireless device, with the cellular network after the modem has transitioned to active mode, to establish a cellular link directly with the cellular network;
   updating, by the wireless device, the DRX cycle when the wireless device is registered with the cellular network, in accordance with the wireless device being connected via the wireless link with the companion device;
   receiving, by the wireless device via the wireless link using the updated DRX cycle, another paging message from the cellular network; and
   communicating, by the wireless device, with the cellular network in response to the another paging message, via the cellular link.

2. The method of claim 1, wherein the wireless link is a link other than one based on the cellular network.

3. The method of claim 2, wherein the wireless link comprises a link that is based on Bluetooth protocol, wireless local area network (WLAN) protocol, or ultra-wideband protocol.

4. The method of claim 1, wherein to establish the cellular link directly with the cellular network comprises to bypass the companion device and the wireless link in communicating with the cellular network.

5. The method of claim 1, wherein in the reduced power mode, the cellular modem is configured to only receive incoming paging messages from the cellular network.

6. The method of claim 1, comprising:
communicating, by the wireless device, with the cellular network via the established cellular link, in response to the paging message.

7. The method of claim 1, comprising:
determining, by at least one sensor of the wireless device, information about the wireless device's movement; and
updating, by the wireless device, the DRX cycle of the cellular modem further in accordance with the information about the wireless device's movement.

8. The method of claim 1, wherein updating the DRX cycle comprises increasing the DRX cycle from a regular or defined DRX cycle to an extended DRX cycle.

9. The method of claim 8, comprising:
transitioning, by the wireless device, from the extended DRX cycle to the regular or defined DRX cycle, when the wireless device ceases to be connected via the wireless link with the companion device.

10. A wireless device comprising:
a cellular modem comprising at least one processor, configured to:
receive a paging message from a cellular network, via a wireless link between the wireless device and a companion device, while the cellular modem is operating in reduced power mode and not registered with the cellular network, and the companion device is registered with the cellular network, the cellular modem configured to operate according to a discontinuous (DRX) cycle;
transition from the reduced power mode to an active mode in response to receiving the paging message via the wireless link with the companion device;
register with the cellular network after the cellular modem has transitioned to active mode, to establish a cellular link directly with the cellular network;
update the DRX cycle when the wireless device is registered with the cellular network, in accordance with the wireless device being connected via the wireless link with the companion device;
receive, via the wireless link using the updated DRX cycle, another paging message from the cellular network; and
communicate with the cellular network via the cellular link in response to the another paging message.

11. The wireless device of claim 10, wherein the wireless link is a link other than one based on the cellular network.

12. The wireless device of claim 10, wherein the cellular modem is configured to:
establish the cellular link directly with the cellular network by bypassing the companion device and the wireless link in communicating with the cellular network.

13. The wireless device of claim 10, wherein the cellular modem is configured to:
communicate with the cellular network in response to the paging message, via the established cellular link.

14. The wireless device of claim 10, comprising:
at least one sensor configured to determine information about the wireless device's movement,
wherein the cellular modem is configured to update the DRX cycle further in accordance with the information about the wireless device's movement.

15. The wireless device of claim 14, wherein updating the DRX cycle comprises increasing the DRX cycle from a regular or defined DRX cycle to an extended DRX cycle.

16. The wireless device of claim 15, wherein the cellular modem is configured to:
transition from the extended DRX cycle to the regular or defined DRX cycle, when the wireless device ceases to be connected via the wireless link with the companion device.

17. A non-transitory computer readable medium storing program instructions for causing at least one processor of a cellular modem of a wireless device to implement steps of:
receive a paging message from a cellular network, via a wireless link between the wireless device and a companion device, while the cellular modem is operating in reduced power mode and not registered with the cellular network, and the companion device is registered with the cellular network, the cellular modem configured to operate according to a discontinuous (DRX) cycle;
transition the cellular modem from the reduced power mode to an active mode in response to receiving the paging message via the wireless link with the companion device;
register the cellular modem with the cellular network after the cellular modem has transitioned to active mode, to establish a cellular link directly with the cellular network; and
update, by the wireless device, the DRX cycle when the wireless device is registered with the cellular network, in accordance with the wireless device being connected via the wireless link with the companion device;
receive, by the wireless device via the wireless link using the updated DRX cycle, another paging message from the cellular network; and
communicate, by the wireless device, with the cellular network in response to the another paging message, via the cellular link.

18. The non-transitory computer readable medium of claim 17, wherein the program instructions cause the at least one processor to:
establish the cellular link directly with the cellular network by bypassing the companion device and the wireless link in communicating with the cellular network.

\* \* \* \* \*